United States Patent
Lang

(10) Patent No.: US 10,476,332 B2
(45) Date of Patent: Nov. 12, 2019

(54) ROTOR ASSEMBLY AND ELECTRODYNAMIC MACHINE WITH AXIAL VENTS FOR HEAT TRANSFER

(71) Applicant: Siemens Industry, Inc., Alpharetta, GA (US)

(72) Inventor: Nicholas G. Lang, Cincinnati, OH (US)

(73) Assignee: SIEMENS INDUSTRY, INC., Alpharetta, GA (US)

( * ) Notice: Subject to any disclaimer, the term of this patent is extended or adjusted under 35 U.S.C. 154(b) by 342 days.

(21) Appl. No.: 15/386,561

(22) Filed: Dec. 21, 2016

(65) Prior Publication Data

US 2018/0175687 A1 Jun. 21, 2018

(51) Int. Cl.
*H02K 1/32* (2006.01)
*H02K 17/16* (2006.01)

(52) U.S. Cl.
CPC .............. *H02K 1/32* (2013.01); *H02K 17/16* (2013.01)

(58) Field of Classification Search
CPC .................................. H02K 1/32; H02K 17/16
USPC ............ 310/125, 61, 64, 52, 57–59, 156.78, 310/156.81, 156.79, 60 A, 211, 406–410, 310/216.114, 216.118
See application file for complete search history.

(56) References Cited

U.S. PATENT DOCUMENTS

| | | |
|---|---|---|
| 3,561,833 A | 2/1971 | Heilmann et al. |
| 3,766,416 A | 10/1973 | Papst et al. |
| 3,969,643 A | 7/1976 | Sapper |
| 4,689,507 A | 8/1987 | Baker et al. |
| 5,177,385 A | 1/1993 | Cooper et al. |
| 6,288,460 B1* | 9/2001 | Fakult ...................... H02K 3/24 310/179 |
| 7,459,818 B2 | 12/2008 | Helmi |
| 8,937,413 B2* | 1/2015 | Puiu ......................... H02K 3/24 310/54 |
| 2012/0153749 A1* | 6/2012 | Chun ..................... H02K 1/185 310/59 |
| 2013/0207493 A1* | 8/2013 | Kaiser ...................... H02K 9/19 310/59 |
| 2013/0342052 A1* | 12/2013 | Turnbull ................... H02K 5/18 310/64 |
| 2014/0070642 A1* | 3/2014 | Lang .................... G06F 17/5018 310/59 |
| 2015/0361990 A1* | 12/2015 | Rodrigues ............. F04D 29/426 415/204 |
| 2016/0294257 A1* | 10/2016 | Murakami ............... H02K 9/19 |
| 2017/0074335 A1* | 3/2017 | Wagner ................. F16D 65/123 |

FOREIGN PATENT DOCUMENTS

| | | |
|---|---|---|
| GB | 1504533 A | 3/1978 |
| JP | 06153471 A | 5/1994 |
| JP | 2006158018 A | 6/2006 |
| JP | 2006211824 A | 8/2006 |

\* cited by examiner

*Primary Examiner* — Jue Zhang
*Assistant Examiner* — Bart Iliya

(57) ABSTRACT

A rotor assembly for an electrodynamic machine includes a lamination section with rotor laminations formed to define annular arrays of axial vents and rotor slots, with rotor conductor bars being disposed in the rotor slots, an end connector supported by the rotor conductor bars, wherein an axial space is formed between the end connector and the lamination section, and an annular guiding element arranged in the axial space between the end connector and the lamination section for guiding a cooling fluid flow in an axial direction.

17 Claims, 4 Drawing Sheets

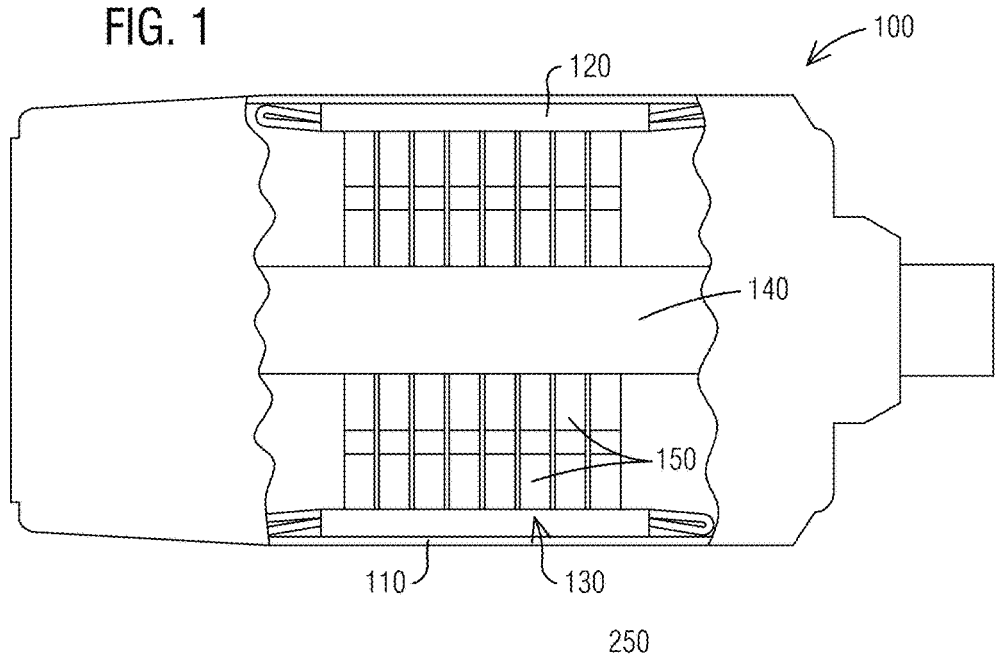
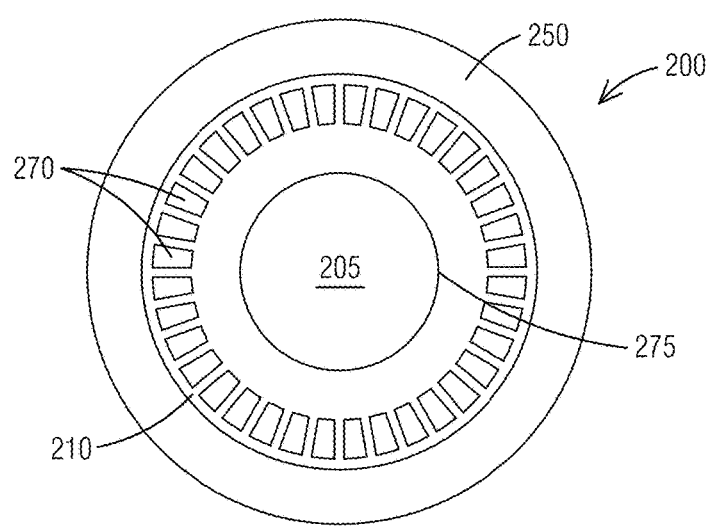

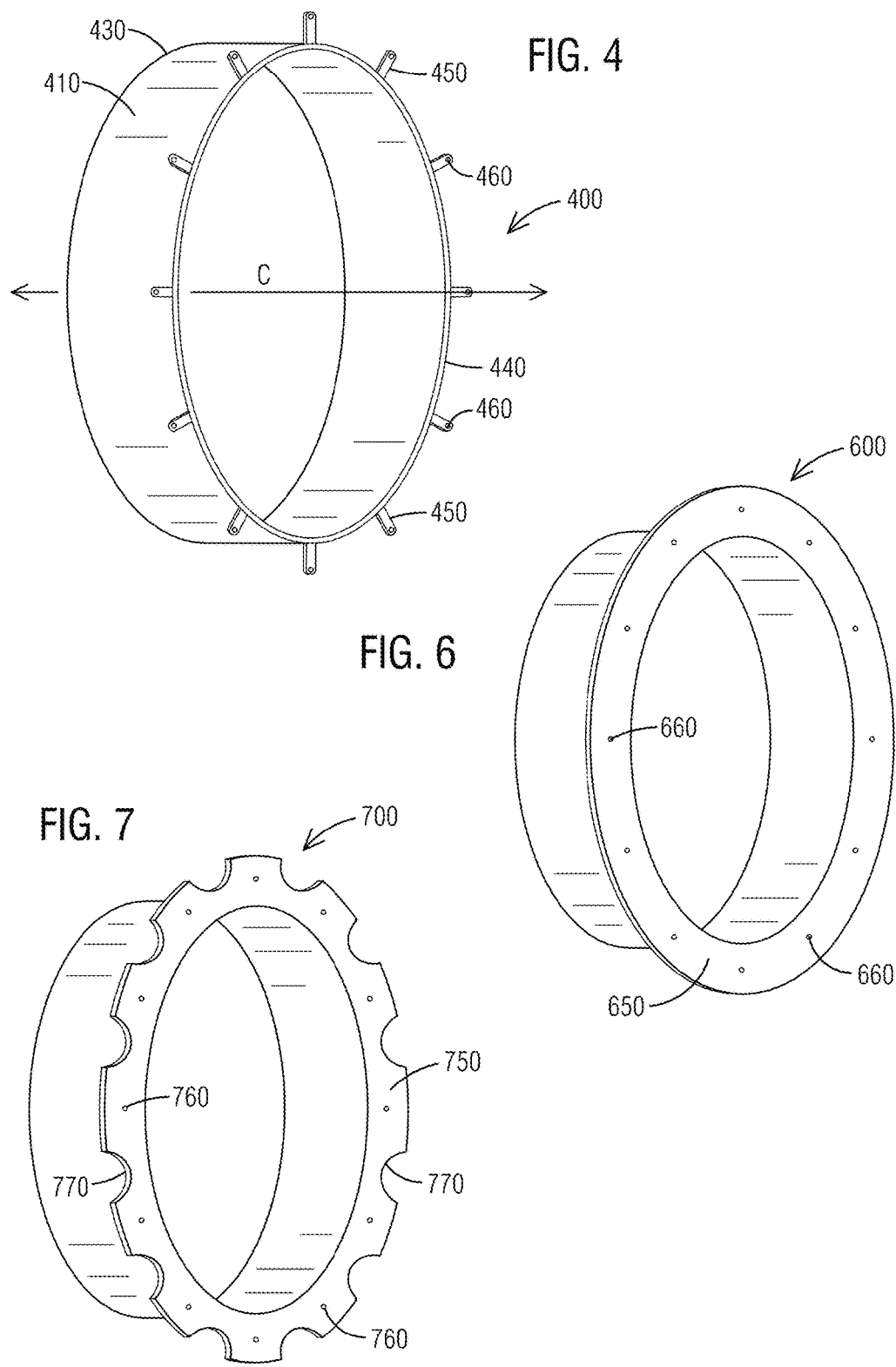

ROTOR ASSEMBLY AND ELECTRODYNAMIC MACHINE WITH AXIAL VENTS FOR HEAT TRANSFER

BACKGROUND

1. Field

Aspects of the present invention generally relate to electrodynamic machines, which include for example electric motors, such as AC asynchronous motors, for example induction motors, and AC synchronous motors, as well as electric generators, and more particularly to rotor assemblies of induction machines with axial vents for heat transfer.

2. Description of the Related Art

Electrodynamic machines typically generate a large amount of heat during operation. Excessive heat can damage internal components, limit the amount of power that can be provided by the machine, and/or adversely affect the longevity of the machine. Electrodynamic machines may have fans or radial and/or axial vents that can remove at least some heat from the machine by drawing cooling air through various passageways in the machine.

Air cooled or gas cooled induction machines, including induction motors and generators, typically employ axial vents for cooling purposes formed in a rotor assembly of the machine. The rotor assembly of an induction machine can be designed as a squirrel cage rotor, such as for example a fabricated copper squirrel cage rotor. The squirrel cage rotor may comprise rotor laminations including rotor conductor bars embedded in the laminations, wherein the axial vents are formed in the rotor laminations. The rotor conductor bars are connected, for example welded or brazed, to end connectors, also referred to short circuit rings. Squirrel cage rotors typically comprise one or more axial spaces between the rotor laminations (or a pressure plate) and the end connectors. But the axial spaces allow the rotor conductor bars to behave like a fan, which draws air away from the intended cooling path of the axial vents, which can be considered a parasitic air flow path. Therefore, a need exists to improve the cooling efficiency of induction machines without adversely affecting the performance of the machine.

SUMMARY

Briefly described, aspects of the present invention generally relate to electrodynamic machines, which include for example electric motors, such as AC asynchronous motors, for example induction motors, and AC synchronous motors, as well as electric generators, and more particularly to rotors of induction machines with axial vents for heat transfer.

A first aspect of the present invention provides a rotor assembly for an electrodynamic machine comprising a lamination section comprising rotor laminations formed to define annular arrays of axial vents and rotor slots, with rotor conductor bars being disposed in the rotor slots, an end connector supported by the rotor conductor bars, wherein an axial space is formed between the end connector and the lamination section, and an annular guiding element arranged at least in the axial space between the end connector and the lamination section for guiding a cooling fluid flow in an axial direction.

A second aspect of the present invention provides an electrodynamic machine comprising a rotor assembly comprising a lamination section with rotor laminations formed to define annular arrays of axial vents and rotor slots, with rotor conductor bars being disposed in the rotor slots, a stator assembly defining an annular core receiving the rotor assembly, the rotor assembly rotating within the stator assembly based on electromagnetic fields generated by the stator assembly and the rotor assembly, a first end connector supported by the rotor conductor bars, wherein a first axial space is formed between the end connector and the lamination section, and a first annular guiding element arranged at least in the first axial space between the end connector and the lamination section for guiding a cooling fluid flow in an axial direction of the rotor assembly.

BRIEF DESCRIPTION OF THE DRAWINGS

FIG. 1 illustrates schematically a cut away elevational view of a known induction machine in accordance with embodiments disclosed herein.

FIG. 3 illustrates a front view of an example squirrel cage rotor of an induction machine in accordance with embodiments disclosed herein.

FIG. 4 illustrates a perspective view of a guiding element for an induction machine in accordance with an exemplary embodiment of the present invention.

FIG. 6 illustrates a front view of a further embodiment of a guiding element for an induction machine in accordance with an exemplary embodiment of the present invention.

FIG. 7 illustrates a front view of a further embodiment of a guiding element for an induction machine in accordance with an exemplary embodiment of the present invention.

DETAILED DESCRIPTION

Figure 2:
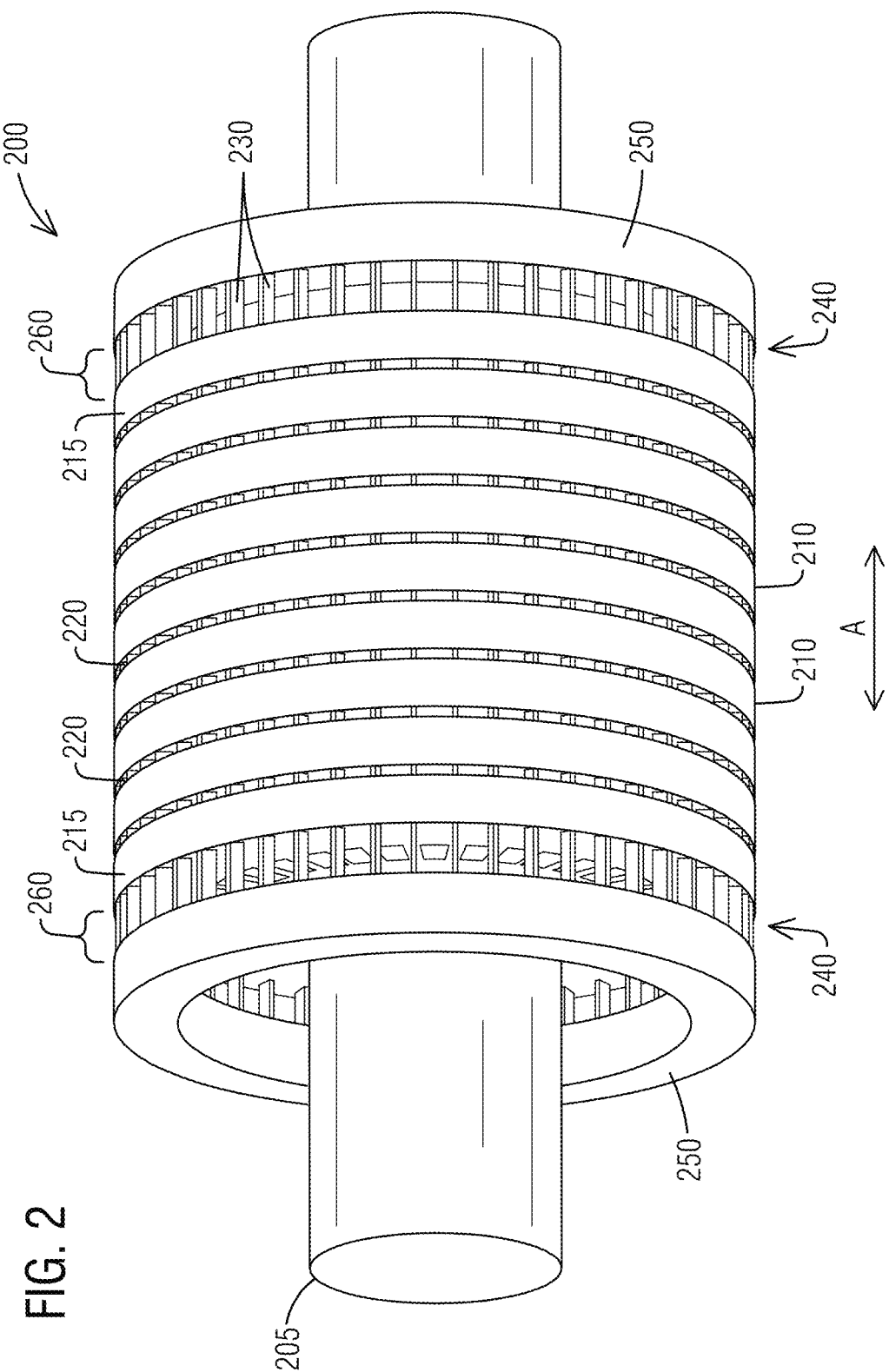
FIG. 2 illustrates a perspective view of an example squirrel cage rotor of an induction machine in accordance with embodiments disclosed herein.

To facilitate an understanding of embodiments, principles, and features of the present invention, they are explained hereinafter with reference to implementation in illustrative embodiments. In particular, they are described in the context of being electrodynamic machines and rotor assemblies of induction machines. Embodiments of the present invention, however, are not limited to use in the described devices or methods.

The components and materials described hereinafter as making up the various embodiments are intended to be illustrative and not restrictive. Many suitable components and materials that would perform the same or a similar function as the materials described herein are intended to be embraced within the scope of embodiments of the present invention.

FIG. 1 illustrates schematically a partial cut away elevational view of an exemplary induction machine 100, which can be an induction motor or an induction generator, in accordance with embodiments disclosed herein. The exemplary machine 100 is a totally enclosed fan cooled alternating current motor, it being understood that the present invention may be applied to other types of electrodynamic machines and electric motors that have a rotating mass. The machine 100 comprises a housing 110 and a stator 120 circumferentially oriented therein. The stator 120 forms a generally annular core into which is axially inserted a rotor assembly 130, which shall hereafter generally be referred to as a rotor. The rotor 130 has a shaft 140 onto which are affixed a stack of abutting rotor laminations 150. The rotor laminations 150, which are flat sheets of insulation coated ferromagnetic metal, e.g., pressed steel, are abutted to form the rotor core. For simplicity, motor components that are not deemed necessary for one skilled in the art to make and use the present invention are not included in the figures.

FIG. 2 illustrates a perspective view of an example squirrel cage rotor assembly 200 of an induction machine in accordance with embodiments disclosed herein. The rotor assembly 200, hereafter generally referred to as squirrel cage rotor or simply rotor, may be used in an induction machine 100 as illustrated in FIG. 1. The rotor 200 may also be used in other suitable types of electric motors or machines.

The rotor 200 includes a plurality of stacked rotor lamination sections 210, wherein each lamination section 210 comprises one or more rotor laminations which may be laminated steel plates or sheets. Each rotor lamination has a central bore and is configured to be received over a rotor shaft 205. Each lamination is formed from a relatively thin piece of sheet metal that is punched, stamped or otherwise cut into shape and then consolidated with one or more adjacent and substantially similarly shaped and sized laminations to form the lamination sections 210. The consolidation is performed in accordance with various known methods. With enough laminations consolidated together, the laminations may form multiple lamination sections 210. The lamination sections 210 are arranged in an axial direction A on the rotor shaft 205, wherein gaps 220 formed between the lamination sections 210 provide radial vents for guiding cooling fluid, such as for example air or cooling gas, through the rotor 200 for cooling purposes.

Further, the rotor 200 includes a plurality of rotor conductor bars 230 radially distributed around the periphery of the lamination sections 210 and received through a respective plurality of outer periphery slots in the rotor laminations. The rotor conductor bars 230 define a pair of opposing bar end regions 240. The rotor 200 further includes end connectors 250, herein referred to as short circuit rings 250 on opposing axial ends, arranged within the bar end regions 240. The rotor conductor bars 230 and/or short circuit rings 250 may be made of, e.g., copper or aluminum. Other suitable conductive material(s) may alternatively be used for rotor conductor bars 230 and/or short circuit rings 250. The short circuit rings 250 are each supported by ends of the rotor conductor bars 230, wherein the rotor conductor bars 230 can be for example welded or brazed to the short circuit rings 250.

As illustrated in FIG. 2, the squirrel cage rotor 200 comprises axial spaces 260 between end lamination sections 215 and the short circuit rings 250, which allow the rotor conductor bars 230, specifically the ends of the bars 230 to behave like a fan, which draws air away from an intended cooling path of axial vents 270 (see FIG. 3).

FIG. 3 illustrates a front view of the example squirrel cage rotor 200 as illustrated in FIG. 2 in accordance with embodiments disclosed herein. FIG. 3 illustrates one of the end connectors 250, the rotor shaft 205 and rotor lamination section 210 supported by the shaft 205. As described before, the rotor lamination section 210 comprises one or more rotor laminations, each lamination comprising a plurality of axial vents 270 and a plurality of slots. The slots are arranged about radial periphery and are each configured to receive there through a rotor conductor bar 230 of the rotor 200 (see FIG. 2). The axial vents 270 may be arranged in a ring around a central bore 275, which receives the shaft 205, and may be openings that pass axially through a plurality of stacked rotor laminations and lamination sections 210 to provide a passageway for cooling air and/or cooling gas to be received through the rotor 200.

FIG. 4 illustrates a perspective view of a guiding element 400 for an induction machine in accordance with an exemplary embodiment of the present invention. The guiding element 400, which is an annular guiding element, provides a designated flow path for a cooling fluid, such as for example air or cooling gas, flowing through an induction machine rotor, for example in the squirrel cage rotor 200 as shown in FIG. 2 (see also FIG. 5). Thus, the guiding element 400 may also be referred to as baffle or air baffle.

In an exemplary embodiment, the guiding element 400 is non-magnetic and/or comprises material(s) that is/are non-magnetic. Further, the guiding element 400 is designed as electrically non-conductive or at least less electrically conductive than other electric parts of the rotor 200, in particular less electrically conductive than the end connectors 250 and the rotor conductor bars 230 of the rotor 200. The end connectors 250 and the rotor conductor bars 230 can comprise for example copper, wherein the guiding element 400 does not comprise copper, but a material or combination of materials that is less conductive than copper and non-magnetic.

In an exemplary embodiment, the guiding element 400 can comprise metal, for example steel or stainless steel, and can be a sheet metal ring or sheet metal hollow cylinder, wherein the ring or hollow cylinder can comprise one or more segments. In an alternative embodiment, the guiding element 400 can comprise plastics or a composite. The guiding element 400 can be a monolithic component, and FIG. 3 shows the hollow cylinder made of one integral piece as a monolithic component. But the guiding element 400 may comprise multiple segments, for example two or four ring sections. Two ring sections can form the annular guiding element 400, wherein each ring section extends for example over 180°. Also, four ring sections can form the annular or circular guiding element 400, wherein each ring section can extend for example over 90°.

The annular guiding element 400 configured as hollow cylinder as shown in FIG. 4 comprises a cylindrical section 410 and two parallel annular bases 430 and 440 perpendicular to the cylinder's axis C. The guiding element 400 comprises a plurality of tabs 450 for mounting the guiding element 400 to another part of the rotor 200, in particular to the short circuit ring 250. The guiding element 400 can comprise different numbers of tabs 450. The exemplary guiding element 400 of FIG. 4 comprises twelve tabs 450, but can comprise more or less than twelve tabs 450, for example eight tabs 450. The tabs 450 are arranged about one of the annular bases 430, 440 and are equidistant from each other, i.e. arranged with equal distances to each other. Each tab 450 can comprise many different shapes or forms, for example rectangular, square, triangular or polygonal, with or without rounded corners. Further, each tab 450 can be configured to comprise an opening or mounting hole 460 for mounting the guiding element 400 to the short circuit ring 250.

Figure 5:
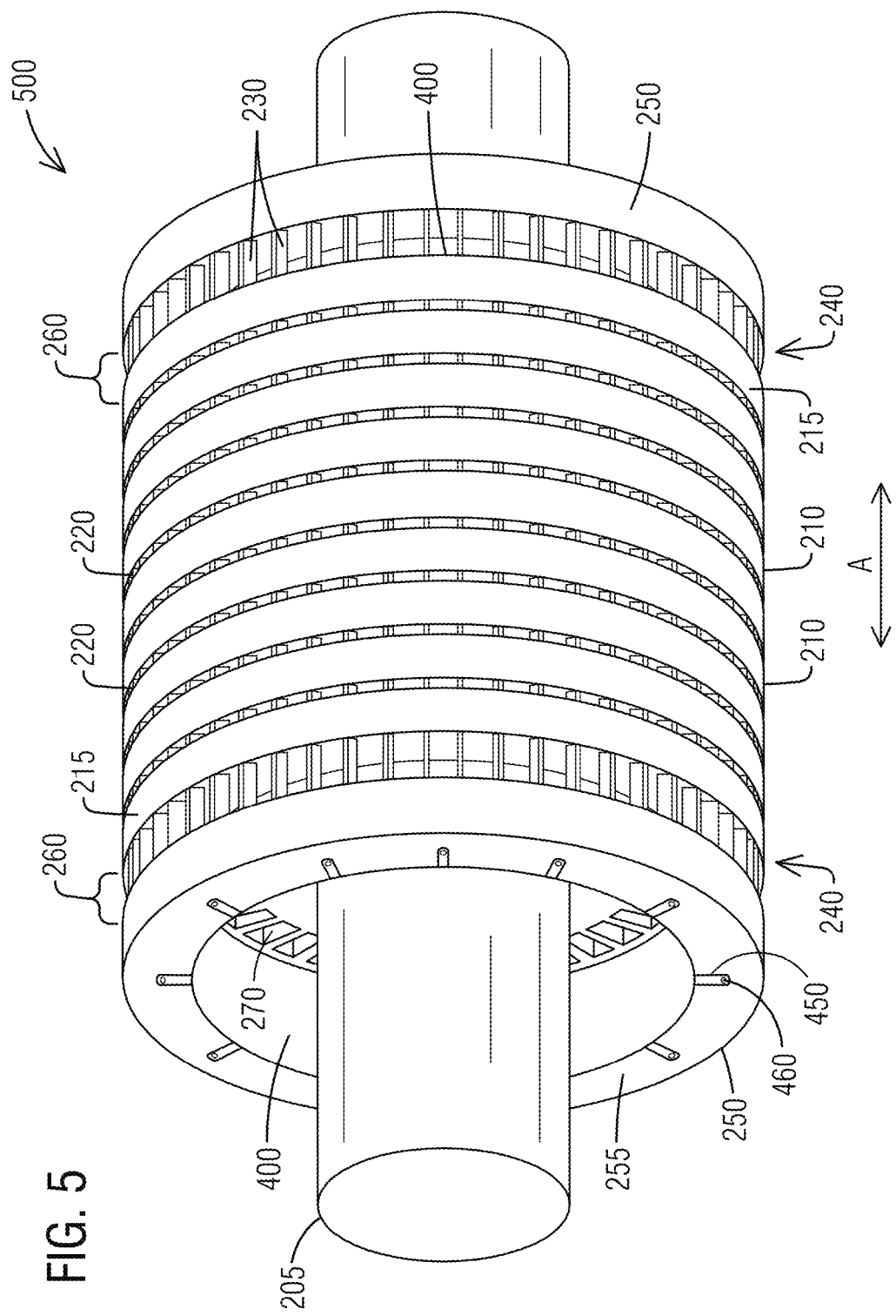
FIG. 5 illustrates a perspective view of a squirrel cage rotor of an induction machine including a guiding element in accordance with an exemplary embodiment of the present invention.

FIG. 5 illustrates a perspective view of a squirrel cage rotor assembly 500 of an induction machine including the guiding element 400 as illustrated in FIG. 4 in accordance with an exemplary embodiment of the present invention. The squirrel cage rotor assembly 500 corresponds essentially to the rotor assembly 200 previously described with reference to FIG. 2.

As FIG. 5 illustrates, the squirrel cage rotor assembly 500, herein also referred to as rotor 500, comprises two guiding elements 400, each arranged in the opposing bar end regions 240 defined by the rotor conductor bars 230. As noted before, because of the design/construction of the rotor 500, the rotor 500 comprises axial spaces 260 between the end lamination sections 215 and the short circuit rings 250, which allow the rotor conductor bars 230, specifically the ends of the bars 230 to behave like a fan, which draws air away from an intended cooling path of axial vents 270 (see FIG. 3).

According to an exemplary embodiment, the guiding elements 400 are arranged at least in the axial spaces 260 for guiding a cooling fluid flow in the axial direction A of the rotor 500. In other words, each guiding element 400 is arranged to bypass or bridge the axial space 260 between the short circuit ring 250 and the end lamination section 215 so that cooling fluid, such as air or cooling gas, cannot flow from the axial vents 270 in a radial direction through the spaces 260 to an outside of the rotor assembly 500. The cooling fluid flows through the axial vents 270 within the lamination sections 210 and outwards of the rotor 500 in the axial direction A and thereby provides improved cooling of the rotor 500 because the cooling fluid cannot escape radially through the spaces 260 and away from the rotor 500. The parasitic air flow path is effectively eliminated. The guiding elements 400 support and further define the cooling path of the axial vents 270.

An outer diameter of the annular guiding element 400 is configured such that it can be positioned on an inner diameter surface of each short circuit ring 250. Thus, the outer diameter of the guiding element 400 corresponds essentially to an inner diameter of the short circuit rings 250. When assembled, the annular guiding element 400 abuts upon the inner diameter surface of the short circuit ring 250 as well as the ends of the rotor conductor bars 230. A width W of the guiding element 400 (which may also referred to as height, for example when the guiding element 400 is referred to as hollow cylinder) is such that the guiding element 400 extends over the axial space 260 as well as the width (height) of the short circuit ring 250. The guiding element 400 bypasses and bridges the axial space 260. The guiding element 400 is coupled to an annular outer surface 255 of the short circuit ring 250, for example bolted or screwed, via the tabs 450 and mounting holes 460. Thus, the short circuit ring 250 comprises corresponding mounting holes which may also be used for balancing of the short circuit ring 250.

The annular guiding element 400 provides an easy and cost-effective solution for providing a designated cooling path of the axial vents 270. The guiding element 400 can be mounted during an assembly of the induction machine or later in the field, for example during a service of a machine, without other modifications. Material strength requirements of the guiding element 400 can be minimized since the guiding element 400 is mostly retained by the rotor conductor bars 230 and the short circuit rings 250. The guiding element 400 can be constructed in two or more pieces to easily fit around fans or other shaft mounted components, as well as minimize fabrication cost of a full cylinder.

FIG. 6 and FIG. 7 illustrate perspective views of further embodiments of guiding elements 600, 700 for an induction machine in accordance with exemplary embodiments of the present invention. The guiding elements 600, 700 comprise essentially the same characteristics and construction as the guiding element 400 described in FIG. 4 with exception of the tabs 450. The guiding elements 600, 700 comprise different tab configurations.

With reference to FIG. 6, the guiding element 600 can comprise a circular or annular mounting element 650 which is coupled to one of the annular bases 430 or 440 (see FIG. 4). The mounting element 650 is in form of a flattened ring or cylinder and comprises the same material(s) as the guiding element 600 since the mounting element 650 is a feature of the guiding element 600. The guiding element 600 does not comprise individual tabs for mounting to the short circuit ring 250. Instead, the guiding element 600 comprises the mounting element 650 with mounting holes 660 provided about the annular mounting element 650, the mounting holes 660 being equidistant from each other. The mounting element 650 can comprise for example twelve mounting holes 660, but can of course also comprise more or less than twelve mounting holes 660. When assembled, the mounting element 650 abuts upon the annular outer surface 255 of the end connector 250 (see FIG. 5). The guiding element 700 of FIG. 7 is similar to the guiding element 600 as shown in FIG. 6 and comprises an annular mounting element 750 with equidistant mounting holes 760. In an embodiment, the mounting element 750 further comprises cut-outs 770, for example to reduce material costs. As noted before with reference to the guiding element 400, the guiding elements 600, 700 can be integrated components, i.e. monolithic components or one-piece components, or can be multiple-piece components comprising one or more segments. The guiding elements 600, 700 can comprise plastics or a composite, and can be formed integrally for example by moulding. In other embodiments, the guiding elements 600, 700 can comprise metal.

While embodiments of the present invention have been disclosed in exemplary forms, it will be apparent to those skilled in the art that many modifications, additions, and deletions can be made therein without departing from the spirit and scope of the invention and its equivalents, as set forth in the following claims.

The invention claimed is:

1. A rotor assembly for an electrodynamic machine comprising:
    a lamination section comprising rotor laminations formed to define annular arrays of axial vents and rotor slots, with rotor conductor bars being disposed in the rotor slots;
    an end connector supported by the rotor conductor bars, wherein an axial space is formed between the end connector and the lamination section; and
    an annular guiding element arranged at least in the axial space between the end connector and the lamination section for guiding a cooling fluid flow in an axial direction,
    wherein the annular guiding element consists of a shape of a hollow cylinder with a cylindrical section, two parallel annular bases perpendicular to a cylinder axis and an annular mounting section which is coupled to one of the two parallel annular bases and extends in a radial direction to form a monolithic component that is configured to be directly bolted on to an outer annular surface of the end connector via the annular mounting section,
    wherein the cylinder axis is parallel to the axial direction of the cooling fluid flow, and
    wherein the cylindrical section of the annular guiding element is configured such that the axial space between an end lamination section of the lamination section and a short circuit ring of the end connector is bridged to avoid a cooling fluid flow in the radial direction by eliminating a parasitic air flow path.

2. The rotor assembly as claimed in claim 1, wherein the annular mounting section comprises a plurality of mounting tabs arranged at one of the two parallel annular bases, and wherein the annular guiding element is mounted to the outer annular surface of the end connector by the mounting tabs.

3. The rotor assembly as claimed in claim 2, wherein each of the plurality of mounting tabs comprises a mounting hole.

4. The rotor assembly as claimed in claim 3, wherein the outer annular surface of the end connector comprises mounting holes which correspond to the mounting holes of the plurality of mounting tabs of the annular guiding element for receiving bolts or screws.

5. The rotor assembly as claimed in claim 1, wherein the annular guiding element comprises metal.

6. The rotor assembly as claimed in claim 1, wherein the annular guiding element comprises plastics or a composite.

7. The rotor assembly as claimed in claim 1, wherein the annular guiding element comprises material that is non-magnetic and comprises a conductivity that is less than a conductivity of a material of the end connector.

8. An electrodynamic machine comprising:
   a rotor assembly comprising a lamination section with rotor laminations formed to define annular arrays of axial vents and rotor slots, with rotor conductor bars being disposed in the rotor slots;
   a stator assembly defining an annular core receiving the rotor assembly, the rotor assembly rotating within the stator assembly based on electromagnetic fields generated by the stator assembly and the rotor assembly;
   a first end connector supported by the rotor conductor bars, wherein a first axial space is formed between the end connector and the lamination section; and
   a first annular guiding element arranged at least in the first axial space between the end connector and the lamination section for guiding a cooling fluid flow in an axial direction of the rotor assembly,
   wherein the first annular guiding element consists of a shape of a hollow cylinder with a cylindrical section, two parallel annular bases perpendicular to a cylinder axis and an annular mounting section which is coupled to one of the two parallel annular bases and extends in a radial direction to form a monolithic component that is configured to be directly bolted on to an outer annular surface of the end connector via the annular mounting section,
   wherein the cylinder axis is parallel to the axial direction of the cooling fluid flow, and
   wherein the cylindrical section of the first annular guiding element is configured such that the axial space between an end lamination section of the lamination section and a short circuit ring of the end connector is bridged to avoid a cooling fluid flow in the radial direction by eliminating a parasitic air flow path.

9. The electrodynamic machine of claim 8, further comprising:
   a second end connector supported by the rotor conductor bars, wherein a second axial space is formed between the second end connector and the lamination section; and
   a second annular guiding element arranged at least in the second axial space between the end connector and the lamination section for guiding the cooling fluid flow in the axial direction of the rotor assembly.

10. The electrodynamic machine of claim 9, wherein the first and second axial spaces lie on opposite axial ends of the lamination section, and wherein the first and second annular guiding elements are positioned on the opposite ends of the lamination section.

11. The electrodynamic machine of claim 9, wherein the first and second annular guiding elements are configured such that the first and second axial spaces between the lamination section and the first and second end connectors are bypassed to avoid the cooling fluid flow in the radial direction.

12. The electrodynamic machine of claim 8, wherein the rotor assembly is configured as a squirrel cage rotor for an induction machine.

13. The electrodynamic machine of claim 8, wherein the first annular guiding element is configured as a metal sheet ring comprising a plurality of mounting tabs for mounting to the first end connector.

14. The electrodynamic machine of claim 13, wherein the first end connector comprises a plurality of mounting holes which correspond to positions of the mounting tabs.

15. The electrodynamic machine of claim 14, wherein the first annular guiding element is bolted to the first end connector via the plurality of mounting tabs and the mounting holes of the first end connector.

16. The electrodynamic machine of claim 14, wherein the plurality of mounting holes of the first end connector are positioned to balance the first end connector.

17. The electrodynamic machine of claim 9, wherein the second annular guiding element is configured as a metal sheet ring comprising a plurality of mounting tabs for mounting to the second end connector.

* * * * *